United States Patent [19]

Nayebi et al.

[11] Patent Number: 6,014,176

[45] Date of Patent: Jan. 11, 2000

[54] AUTOMATIC PHASE CONTROL APPARATUS FOR PHASE LOCKING THE CHROMA BURST OF ANALOG AND DIGITAL VIDEO DATA USING A NUMERICALLY CONTROLLED OSCILLATOR

[75] Inventors: Mehrdad Nayebi, Palo Alto; Steve Edwards, San Jose, both of Calif.

[73] Assignees: Sony Corporation, Tokyo, Japan; Sony Electronics, Inc., Park Ridge, N.J.

[ * ] Notice: This patent is subject to a terminal disclaimer.

[21] Appl. No.: 08/585,398

[22] Filed: Jan. 11, 1996

Related U.S. Application Data

[60] Provisional application No. 60/000,368, Jun. 21, 1995.

[51] Int. Cl.[7] .................................................. H04N 9/45
[52] U.S. Cl. ......................... 348/539; 348/512; 348/584; 348/505
[58] Field of Search ................................. 348/505, 512, 348/508, 516, 517, 537, 559, 549, 563, 584, 589, 600; 327/156, 157, 149, 159; 331/1 A, 17, 25, 20; 375/376; H04N 5/262, 5/278, 9/44, 9/445

[56] References Cited

U.S. PATENT DOCUMENTS

| | | | |
|---|---|---|---|
| 4,038,683 | 7/1977 | Thrope et al. | 348/505 |
| 4,115,820 | 9/1978 | Morio et al. | 360/33 |
| 4,183,048 | 1/1980 | Isono et al. | 358/28 |
| 4,197,556 | 4/1980 | Isono et al. | 358/28 |
| 4,404,583 | 9/1983 | Tatami | 358/13 |
| 4,729,013 | 3/1988 | Tatami et al. | 358/19 |
| 4,733,311 | 3/1988 | Yoshinaka | 358/320 |
| 5,202,669 | 4/1993 | Ishimochi et al. | 348/563 |
| 5,239,561 | 8/1993 | Wong et al. | 375/81 |
| 5,243,412 | 9/1993 | Goukura et al. | 358/19 |
| 5,528,307 | 6/1996 | Owada et al. | 348/497 |
| 5,541,666 | 7/1996 | Zeidler et al. | 348/589 |
| 5,594,507 | 1/1997 | Hoarty | 348/584 |
| 5,608,463 | 3/1997 | Ohmori | 348/540 |
| 5,633,688 | 5/1997 | Choi et al. | 348/584 |
| 5,663,688 | 9/1997 | Delmas et al. | 331/14 |
| 5,719,532 | 2/1998 | Nayebi et al. | 331/20 |
| 5,742,191 | 4/1998 | Romesburg et al. | 327/156 |
| 5,748,044 | 5/1998 | Xue | 331/2 |
| 5,815,212 | 9/1998 | Edwards et al. | 348/501 |

*Primary Examiner*—Michael H. Lee
*Attorney, Agent, or Firm*—Haverstock & Owens LLP

[57] ABSTRACT

A video/graphics overlay integrated circuit receives an analog composite video signal and a digital composite video signal and combines them in a predetermined format into an output composite video signal which is transmitted to a display device such as a television set. The digital video signal may be comprised of digital video, graphics data or a combination of digital video and graphics data. The digital video and graphics data are encoded by a digital encoder integrated circuit into a digital composite video signal. The digital composite video signal is coupled to the video/graphics overlay integrated circuit. An automatic phase correction circuit detects any phase difference between the burst signals of the analog composite video signal and the digital composite video signal. A phase control signal is generated by the automatic phase correction circuit and used to correct the phase and frequency of the digital composite video signal and ensure that it corresponds to the phase and frequency of the analog composite video signal. The automatic phase correction circuit uses the analog composite video signal as the master and adjusts the phase and frequency of the digital composite video signal until they are locked to the phase and frequency of the analog composite video signal. A numerically controlled oscillator generates an appropriate oscillating sinusoidal signal representing a burst frequency signal within the digital composite video signal. The phase and frequency of the oscillating sinusoidal signal are appropriately monitored and adjusted to correspond with the phase and frequency of the analog composite video signal.

28 Claims, 5 Drawing Sheets

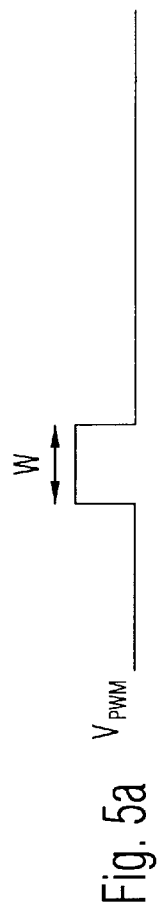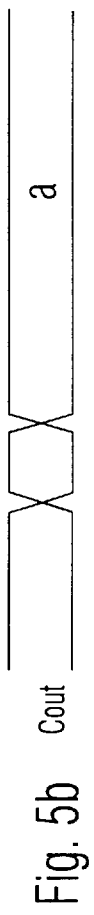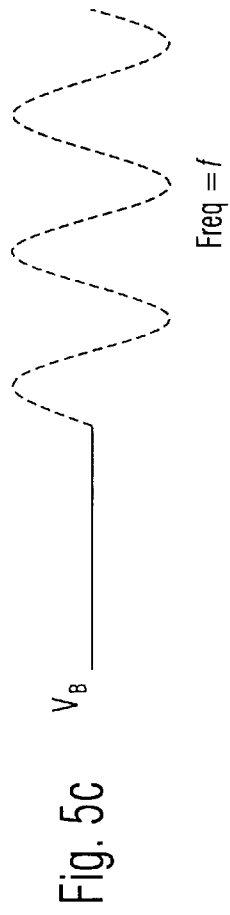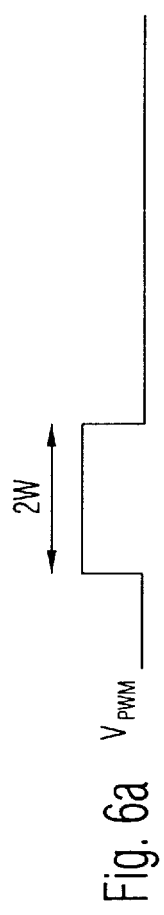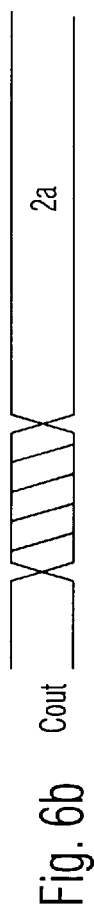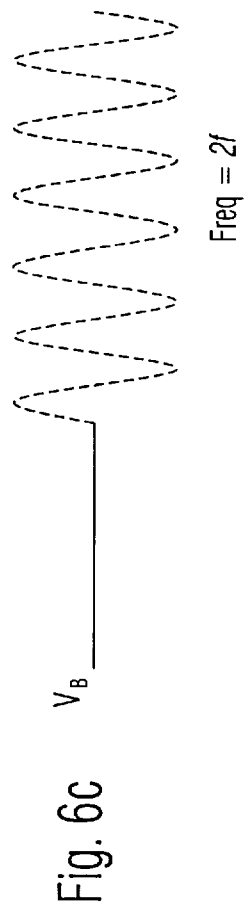

AUTOMATIC PHASE CONTROL APPARATUS FOR PHASE LOCKING THE CHROMA BURST OF ANALOG AND DIGITAL VIDEO DATA USING A NUMERICALLY CONTROLLED OSCILLATOR

RELATED APPLICATIONS

This application claims priority under 35 U.S.C. §119(e) of the co-pending U.S. provisional application Ser. No. 60/000,368 filed on Jun. 21, 1995 and entitled "System To Phase Lock The Chroma Burst Of Analog And Digital Video." The provisional application Ser. No. 60/000,368 filed on Jun. 21, 1995 and entitled "System To Phase Lock The Chroma Burst Of Analog And Digital Video" is also hereby incorporated by reference.

FIELD OF THE INVENTION

The present invention relates to the field of locking the frequency of two signals together in phase. In particular, the present invention relates to the field of locking two composite video signals in phase within a video signal processing apparatus.

BACKGROUND OF THE INVENTION

The technique of digitally encoding a video signal and particularly a composite video signal, is well known. Sampling pulses are generated in synchronism with a color video burst signal. The sampling pulses have a repetition rate that is a multiple of the burst signal frequency. Each sample of the color video signal is encoded, or digitized, such as by pulse code modulation (PCM). Digitally encoded video signals are used in time base error correction devices, noise suppression devices, the addition of various special video effects and the like. Digitally encoded video signals are particularly advantageous for recording and reproduction and also for special types of transmission.

In many video transmission systems, color or chrominance information is represented by a particular phase of the chrominance subcarrier signal that is amplitude modulated with color information. Since the phase of the color subcarrier signal is used to represent color information, it is important that, when digitally encoding the color video signal, the phase of the sampling pulses be accurately controlled. Undesired phase shifts, such as may be due to temperature drift, aging of the electrical components, and the like, may result in a phase error in the sampling pulse relative to the chrominance subcarrier signal which has the effect of distorting or interfering with the overall chrominance effect of the video picture which ultimately is reproduced from the digitally encoded video signal.

To identify the aforementioned phase shifts between the sampling pulses and the chrominance subcarrier signal, the instantaneous phase angle of the burst signal at the time of sampling is determined. If the phase angle of the burst signal differs from a desired phase angle, the phase of the sampling pulses may be adjusted accordingly. If the phase angle of the burst signal is different than an expected phase angle, the phase difference between the modulated chrominance information and the signal will also be in error, thereby causing distortion of the color within an output video signal.

A composite color video signal includes horizontal synchronizing signals, a burst signal superimposed onto the pedestal level at the back porch of the horizontal synchronizing signal and a video information signal. The video information signal comprises a chrominance subcarrier having different phases amplitude-modulated with chrominance information. The composite color video signal includes both luminance and chrominance information.

Separator circuits are utilized to separate the horizontal synchronizing signal and the burst signal from the incoming video signal. The burst signal has a burst signal frequency equal to 3.58 MHz, which is the frequency of the chrominance subcarrier $f_{SC}$.

A schematic block diagram of a digital encoder of the prior art, as taught by Tatami in U.S. Pat. No. 4,404,583, is illustrated in FIG. 1. In this digital encoder the incoming video signal is sampled at the sampling rate $4f_{SC}$. The sampling pulses which are supplied to the sample-and-hold circuit 2 from the clock generator circuit 5 are phase-synchronized with the incoming burst signal and, generally, each sampling tracks phase shifts present within the burst signal. However, the actual phase of the sampling pulses relative to, for example, the phase of the chrominance subcarrier signal, may drift from the desired phase-lock relationship. This drift may be due to temperature changes in temperature-sensitive circuit components, changes in the operation of such components due to age, and the like. As a result of this phase shift in the sampling pulses, errors, such as phase errors, may be introduced into the sampled video signal, thereby introducing errors into the digitally encoded color video signal. If left uncorrected, the color of the video picture reproduced from the encoded video signal, having the phase errors, may be erroneous.

In order to correct the above-mentioned phase errors, a phase detecting circuit 7 is included within the digital encoding circuit. This sampling phase detector 7 is coupled to the output of the A/D converter 3 and is adapted to produce a control signal which is a function of the phase error, if any, within the signal. If the phase of the sampling pulses generated by the clock generator circuit 5 and supplied to the sample-and-hold circuit 2 drifts, the sampling phase detector 7 is adapted to detect this drift and supply a compensating control signal to the phase shift circuit 6. This compensating control signal controls the phase shift circuit to adjust the phase of the sampling pulses so as to restore the desired, predetermined phase relationship thereof.

The sampling phase detector 7 is adapted to receive the digitally encoded samples of the burst sample, as output by the A/D converter 3, and to derive therefrom an indication, or representation, of the actual phase angle at which the burst signal is sampled. When the sampling pulses exhibit the proper phase relationship with respect to the burst signal, the burst signal will be sampled at a predetermined phase angle thereof. However, if the determined sampled phase of the burst signal differs from this predetermined phase angle, the sampling phase detector 7 outputs a control signal used to control the phase shift circuit 6 in order to shift the phase of the sampling pulses so as to bring them into coincidence with the predetermined burst phase angle.

The clock generator circuit 5 includes a phase comparator 10, a low pass filter 11, a voltage controlled oscillator (VCO) 12 and a frequency divider 13. The VCO 12 is adapted to generate a local oscillating signal whose frequency is equal to the sampling frequency $4f_{SC}$. The output of the VCO 12 is frequency-divided by the frequency divider 13. The dividing ratio of the frequency divider 13 is equal to four such that the frequency divider produces a frequency-divided local oscillating signal whose frequency is equal to the burst signal frequency $f_{SC}$. This frequency-divided local oscillating signal is supplied through the phase shift circuit 6 as an input to the phase comparator 10. The other input of the phase comparator 10 is coupled to the separator circuit 4 and is adapted to receive the burst signal within the composite video signal. Any phase difference between the phase-shifted, frequency-divided local oscillating signal and the received burst signal is detected by the phase comparator 10 and output as a phase error. This phase error signal from the phase comparator 10 is then filtered by the low pass filter 11 and supplied as a control signal to the VCO 12. The phase of the sampling pulses generated by the VCO 12 is adjusted in response to the phase error signal from the phase comparator 10 so as to reduce the phase error signal to a null value.

The use of a clock generating circuit having a VCO 12 is well known in the art. However, the use of a VCO in a phase control circuit has a tendency to introduce noise and other unwanted effects into the digitally encoded composite video signal. What is needed is an automatic phase control circuit which does not include a voltage controlled oscillator, thereby reducing the susceptibility of noise on the phase control circuit.

SUMMARY OF THE INVENTION

A video/graphics overlay integrated circuit receives an analog composite video signal and a digital composite video signal and combines them in a predetermined format into an output composite video signal which is transmitted to a display device such as a television set. The digital video signal may be comprised of digital video, graphics data or a combination of digital video and graphics data. The digital video and graphics data are encoded by a digital encoder integrated circuit into a digital composite video signal. The digital composite video signal is coupled to the video/graphics overlay integrated circuit. An automatic phase correction circuit detects any phase difference between the burst signals of the analog composite video signal and the digital composite video signal. A phase control signal is generated by the automatic phase correction circuit and used to correct the phase and frequency of the digital composite video signal and ensure that it corresponds to the phase and frequency of the analog composite video signal. The automatic phase correction circuit uses the analog composite video signal as the master and adjusts the phase and frequency of the digital composite video signal until they are locked to the phase and frequency of the analog composite video signal. A numerically controlled oscillator generates an appropriate oscillating sinusoidal signal representing a burst frequency signal within the digital composite video signal. The phase and frequency of the oscillating sinusoidal signal are appropriately monitored and adjusted to correspond with the phase and frequency of the analog composite video signal.

BRIEF DESCRIPTION OF THE DRAWINGS

FIGS. 5a, 5b and 5c illustrate the control signals VPWM and Cout and a corresponding burst frequency output signal VB.

FIGS. 6a, 6b and 6c illustrate the control signals VPWM and Cout and a corresponding burst frequency output signal VB.

DETAILED DESCRIPTION OF THE PREFERRED EMBODIMENT

Figure 1:
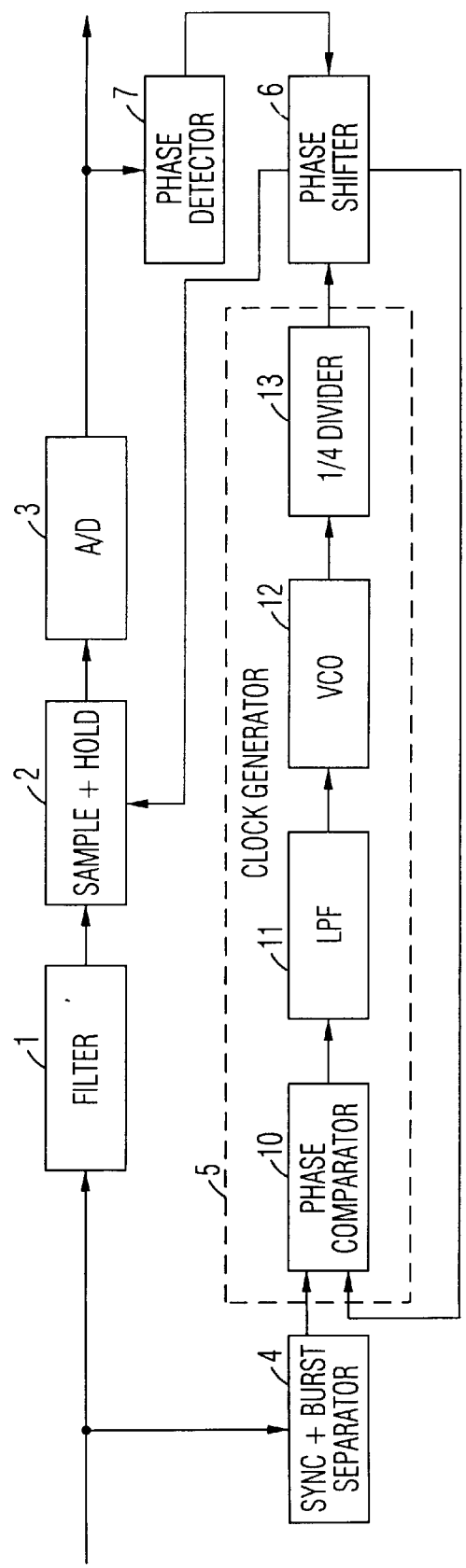
FIG. 1 illustrates a schematic block diagram of a digital encoder of the prior art.
Figure 2:
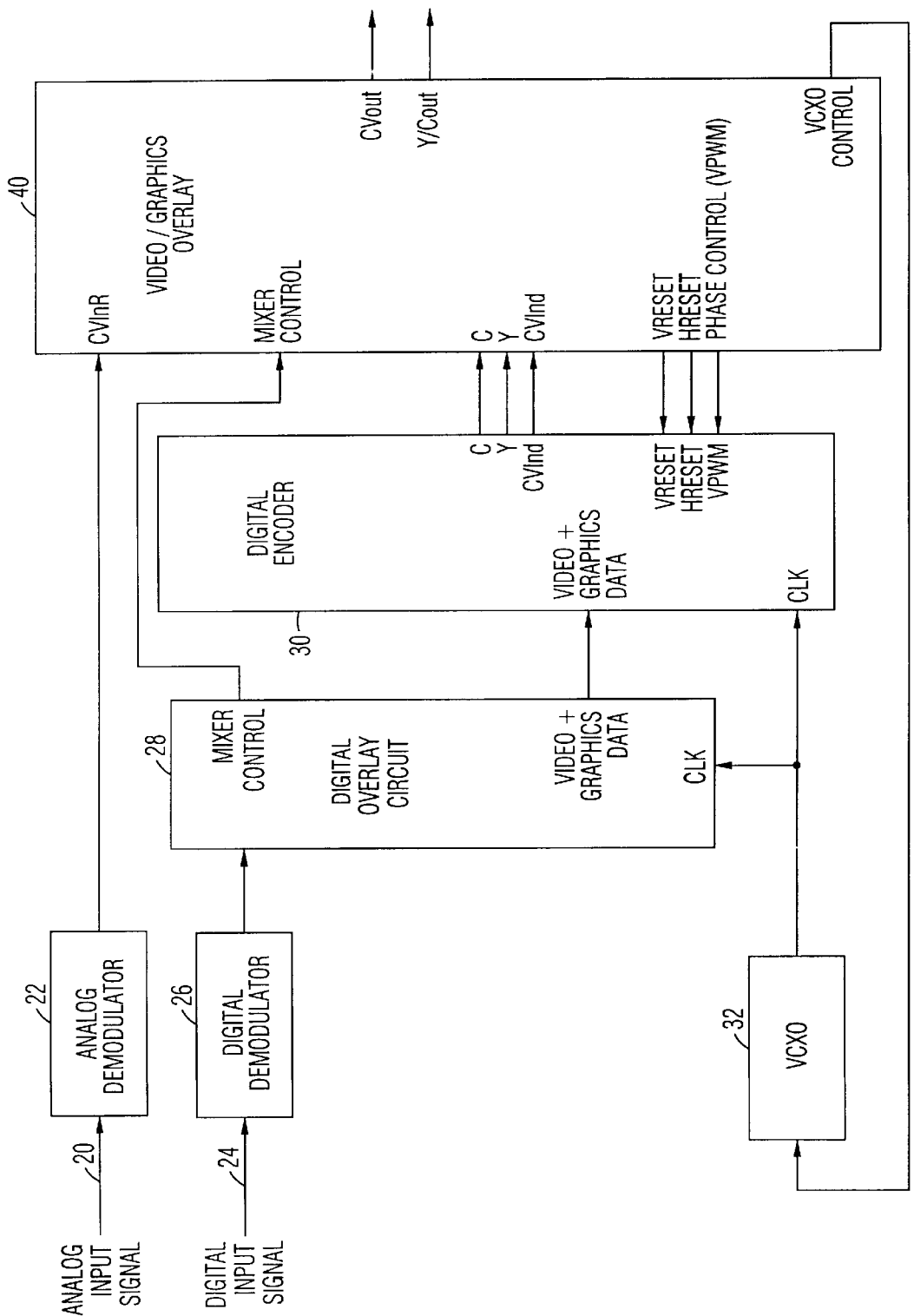
FIG. 2 illustrates a schematic block diagram of a video display system according to the present invention.

A block diagram circuit schematic of a video display system according to the present invention is illustrated in FIG. 2. An analog input video signal is input to an analog demodulator 22. An output of the analog demodulator 22 is coupled as an analog input composite video signal CVInR to a video/graphics overlay integrated circuit 40. A digital input video signal is input to a digital demodulator 26. An output of the digital demodulator 26 is coupled as an input to a digital overlay control circuit 28. A video and graphics data output of the digital overlay control circuit 28 is coupled as an input to a digital encoder 30 to provide the digital video signal to the digital encoder 30. A mixer control output of the digital overlay circuit 28 is coupled as an input to the video/graphics overlay integrated circuit 40. A voltage controlled oscillator (VCXO) 32 is coupled to provide a clock input signal to the digital overlay control circuit 28 and the digital encoder integrated circuit 30. The VCXO 32 is controlled by a control signal VCXO Control output from the video/graphics overlay integrated circuit 40. The digital encoder integrated circuit 30 encodes the video and graphics data received from the digital overlay control circuit 28 into an analog format composite video signal, which will be referred to as a digital input composite video signal CVInd, or a Y/C video signal (S-Video), depending on the format of the video and graphics data input. The digital encoder integrated circuit 30 is coupled to provide the digital input composite video signal CVInd, a separate chrominance C output signal C and a separate luminance Y output signal Y, as inputs to the video/graphics overlay integrated circuit 40. The video/graphics overlay integrated circuit 40 is coupled to provide control signals VReset, HReset and Phase Control (VPWM) as inputs to the digital encoder integrated circuit 30.

The video/graphics overlay integrated circuit 40 of the present invention is configured to receive the analog input composite video signal CVInR and the digital input composite video signal CVInd which are combined in a predetermined format into an output composite video signal CVout. The video/graphics overlay integrated circuit 40 is configured for providing the output composite video signal CVout to a display system, such as a television. The video/graphics overlay integrated circuit 40 also provides Y/C video output signals to output a Y/C format video signal. If a Y/C format video signal is received by the video/graphics overlay integrated circuit 40 from the digital encoder integrated circuit 30 then the video/graphics overlay integrated circuit 40 will pass the Y and C signals through to the Y/C output and provide them in a purely digital format.

The digital video signal may be comprised of digital video, graphics data or both. In the preferred embodiment of the present invention, the output signal CVout may contain analog video only, analog video with graphics, digital video only, digital video with graphics and graphics only. The contents of the output signal CVout and the mixture or ratio of the output is controlled by the mixer control signals provided from the digital overlay control circuit 28. The digital video and graphics data are encoded into an analog format composite video signal using the digital encoder integrated circuit 30 and output as the digital input composite video signal CVInd. This output is coupled to the video/graphics overlay integrated circuit 40. If the composite video output signal CVout is to contain both analog and digital video information, then the analog video signal CVInR and the digital composite video signal CVInd are combined by the video/graphics overlay integrated circuit 40 using a predetermined ratio of signals, as specified by the mixer control signals, and output as the analog format composite video output signal CVout. It should be understood that when the digital input composite video signal CVInd is discussed herein an analog format composite video signal representing the digital video and graphics signal received by the digital encoder integrated circuit 30 from the digital overlay control circuit 28 is being referred to. In this configuration, the digital composite video signal CVInd must be in phase with the analog input video signal CVInR in order to avoid a distorted output signal and also to ensure the output video picture contains the appropriate colors. Accordingly, the video display system of the present invention employs an automatic phase correction circuit integrated within both the video/graphic overlay integrated circuit 40 and the digital encoder integrated circuit 30, as will be explained below, to lock the burst frequency and phase of the digital composite video signal CVInd to the burst frequency and phase of the analog input video signal CVInR.

When only a pure analog video signal is to be output by the video/graphics overlay integrated circuit 40, the analog input video signal CVInR is passed through the video/graphics overlay integrated circuit 40 and output as the composite video output signal CVout, without any mixing or encoding. Correspondingly, when only a pure digital, graphics or combined digital and graphics signal is to be output by the video/graphics overlay integrated circuit 40, the digital composite video signal CVInd, received from the digital encoder integrated circuit 30, is passed through the video/graphics overlay integrated circuit 40 and output as the composite video output signal CVout, without any mixing. When the mixer control signals specify that the composite video output signal CVout is to contain a predetermined portion of the analog input composite video signal CVInR and a predetermined portion of the digital input composite video signal CVInd, then the signals CVInR and CVInd are combined by the video/graphics overlay integrated circuit 40 into the output composite video signal CVout.

The mixer control signals include three signal lines M0, M1 and $\alpha$. The signals M0 and M1 specify the content of the output composite video signal CVout and the signal $\alpha$ specifies the ratio of the analog input composite video signal CVInR to the digital input composite video signal CVInd, if both are to be combined. If a digital input video signal and graphics are to be combined into the digital input composite video signal, this is done by the digital overlay control circuit 28 and provided to the digital encoder integrated circuit 30 at the video and graphics data input. The following table illustrates the relationship of the mixer signals M0, M1 and $\alpha$ to the contents of the output composite video signal CVout.

TABLE I

| M0 | M1 | CVout |
|----|----|-------|
| L | L | CVout = $\alpha$CVInR + (1-$\alpha$)CVInd |
| H | L | CVout = CVInR |
| L | H | CVout = CVInd |
| H | H | Not used |

As Table I illustrates, when both of the mixer control signals M0 and M1 are at a logical low voltage level the output composite video signal CVout is comprised of a level of the analog input composite video signal CVInR equal to the level of the signal $\alpha$ and a level of the digital input composite video signal CVInd equal to the level of one minus the level of the signal $\alpha$. When the mixer control signal M0 is at a logical high voltage level and the mixer control signal M1 is at a logical low voltage level the output composite video signal CVout is comprised of only the analog input composite video signal CVInR. When the mixer control signal M0 is at a logical low voltage level and the mixer control signal M1 is at a logical high voltage level the output composite video signal CVout is comprised of only the digital input composite video signal CVInd.

Figure 3:
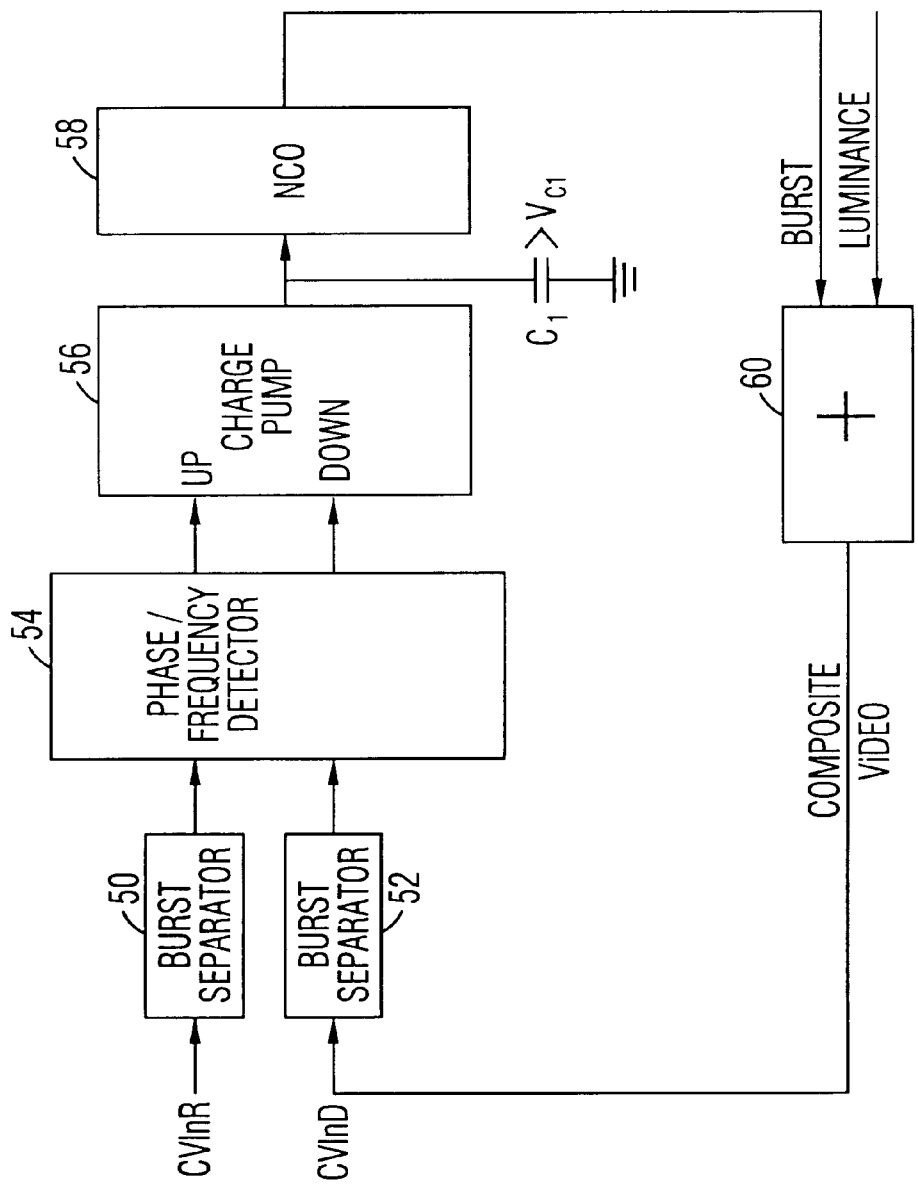
FIG. 3 illustrates a schematic block diagram of an automatic phase correction circuit according to the present invention.

When the analog input composite video signal CVInR and the digital input composite video signal CVInd are mixed and combined into the output composite video signal CVout it is necessary that the phase and frequency of the input video signals CVInR and CVInd are equal to ensure a correct display of the output video. An automatic phase correction circuit according to the present invention is illustrated in FIG. 3. The automatic phase correction circuit locks the burst frequency of the analog composite video signal CVInR and the digital video signal CVInd together utilizing a numerically controlled oscillation circuit when both the analog and digital video signals are combined into the composite video output signal CVout. The phase and frequency of the digital composite video signal CVInd are adjusted to match the phase and frequency of the analog input composite video signal CVInR. The burst frequency and phase of the digital composite video signal CVInd is compared to the burst frequency and phase of the input analog composite video signal CVInR. Any difference detected between the burst frequency and phase of the digital composite video signal CVInd and the analog input composite video signal CVInR is determined and then used to correct the burst frequency and phase of the digital composite video signal CVInd.

In the automatic phase correction circuit illustrated in FIG. 3, the analog input composite video reference signal CVInR is coupled as an input to a burst separator circuit 50 for separating the analog burst signal from the analog input composite video signal CVInR. The digital composite video signal CVInd is coupled as an input to a burst separator circuit 52 for separating the digital burst signal from the digital composite video signal CVInd. The outputs of both of the burst separators 50 and 52 are coupled as inputs to the phase/frequency detector circuit 54. The phase/frequency detector circuit 54 compares the two inputs and detects any difference in phase or frequency between the burst signals of the analog input composite video signal CVInR and the digital input composite video signal CVInd. If the phase/frequency detector circuit 54 detects any difference in phase or frequency between the two inputs then a correction signal is output from the phase/frequency detector circuit 54. The phase/frequency detector circuit 54 is coupled to a charge pump 56 to provide an up correction signal input and a down correction signal input which correspond to the detected difference between the phase and frequency of the two inputs. An output of the charge pump 56 is coupled to a first terminal of a capacitor C1 and as an input to a numerically controlled oscillator 58. A second terminal of the capacitor C1 is coupled to ground. The output from the charge pump 56 is used to build a charge up on the capacitor C1 which controls the operation of the numerically controlled oscillator (NCO) 58. The output oscillation signal from the NCO 58 is input to an adder 60 which combines the burst oscillation signal output from the NCO 58 with a luminance information signal into the digital composite video signal CVInd. In this manner the automatic phase correction circuit adjusts the phase of the digital composite video signal CVInd to lock it to the phase of the analog input composite video signal CVInR. The adder 60 and a portion of the NCO are integrated within the digital encoder integrated circuit 30 in the preferred embodiment of the present invention. In the preferred embodiment the remainder of the automatic phase correction circuit, including a portion of the NCO 58, is integrated within the video/graphics overlay integrated circuit 40, as will be described in detail below.

Figure 4:
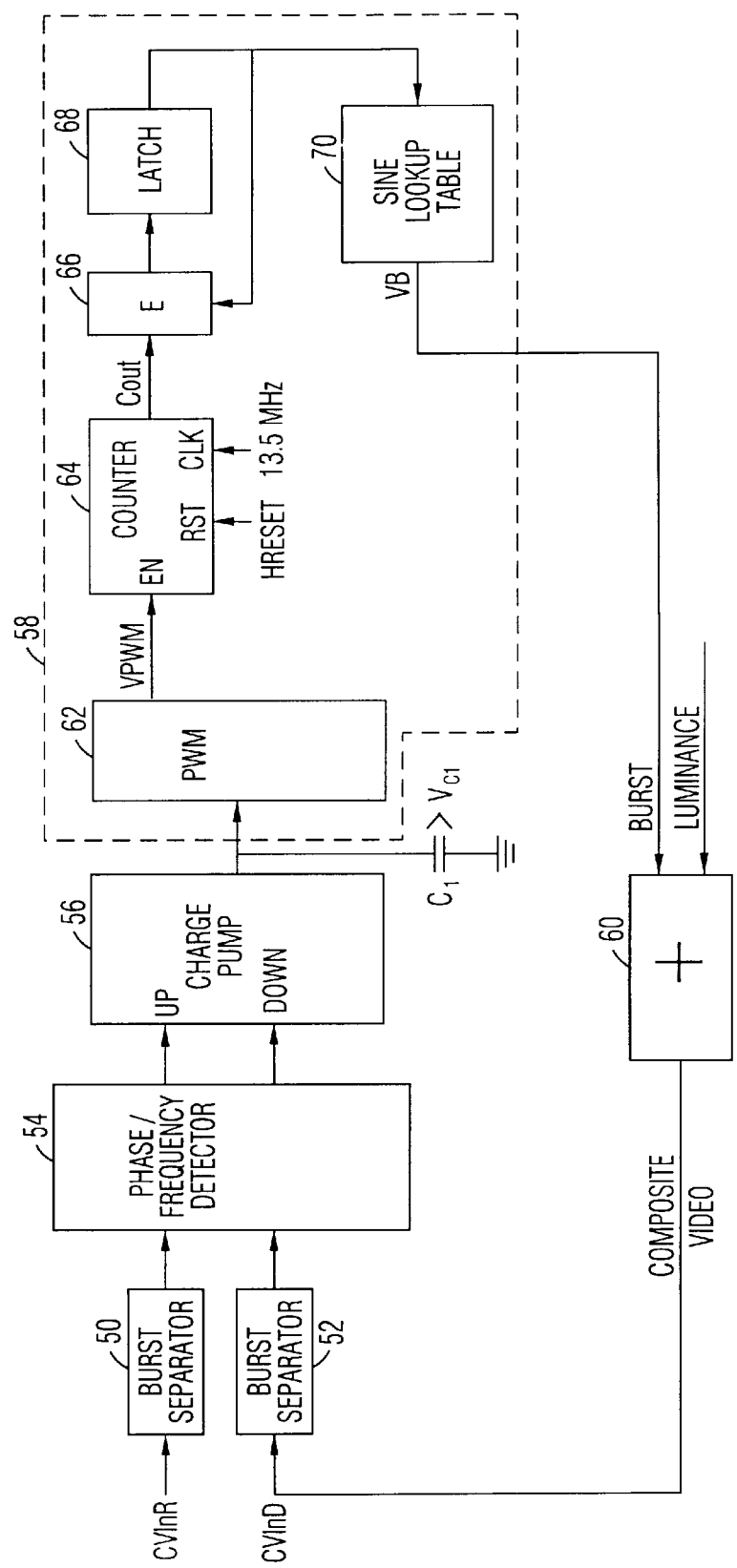
FIG. 4 illustrates a detailed schematic block diagram of the automatic phase correction circuit according to the present invention.

A more detailed block schematic diagram illustrating the components of the NCO 58 is illustrated in FIG. 4. The output from the charge pump 56 and the first terminal of the capacitor C1 are coupled as an input to a pulse width modulator (PWM) 62. An output VPWM of the PWM 62 is coupled as an enable input to a counter 64. The horizontal reset signal HReset is coupled as a reset input to the counter 64. An output Cout of the counter 64 is coupled as an input to a summing circuit 66. An output of the summing circuit 66 is coupled as an input to a latch 68. An output of the latch 68 is coupled as an input to the summing circuit 66, thereby forming an accumulator circuit comprising the summing circuit 66 and the latch 68 coupled together in a feedback loop. The output of the latch 68 is also coupled as an input to a sine lookup table 70 to provide an address for the sine lookup table 70 for which a corresponding output sinusoidal signal VB is generated. The output VB of the sine lookup table 70 forms the output of the NCO 58 and is coupled to the adding circuit 60 to provide an oscillating sinusoidal signal representing the burst signal of the digital composite video signal CVInd.

The PWM 62, the counter 64, the summer 66, the latch 68 and the sine lookup table 70 together form the NCO 58. In the preferred embodiment of the present invention, the PWM 62 is integrated within the video/graphics overlay integrated circuit 40. Also in the preferred embodiment, the counter 64, the summer 66, the latch 68 and the sine lookup table 70 are integrated within the digital encoder integrated circuit 30. The output VPWM of the PWM 62 is therefore transmitted from the video/graphics overlay integrated circuit 40 to the digital encoder 30 as the phase control signal. The horizontal reset signal HReset is also transmitted from the video/graphics overlay integrated circuit 40 to the digital encoder integrated circuit 30 when a horizontal sync pulse is detected. The digital composite video signal CVInd is transmitted from the digital encoder integrated circuit 30 to the video/graphics overlay integrated circuit 40. In this manner, the components of the automatic phase correction circuit of the present invention lock the phase and frequency of the digital composite video signal CVInd to the phase and frequency of the analog input composite video signal CVInR. It should be specifically noted that the phase and frequency of the analog input composite video signal CVInR are not adjusted, but rather the analog input composite video signal CVInR is used as the master signal and the digital input composite video signal CVInd is adjusted or slaved off of the analog signal CVInR.

A controllable voltage controlled oscillator (VCXO) 32 provides an input system clock signal to the digital encoder integrated circuit 30. The control signal input to the VCXO 32 is provided from the video/graphics overlay integrated circuit 40 in response to any difference in frequency detected by the phase/frequency detector 54 between the analog input composite video signal CVInR and the digital input composite video signal CVInd. The frequency of the digital input composite video signal CVInd is therefore adjusted to match the frequency of the analog input composite video signal CVInR by adjusting the frequency of the clock signal output from the VCXO 32 when both the analog and digital inputs CVInR and CVInd are combined. In the preferred embodiment of the present invention the VCXO is capable of generating a clock signal of 27 MHz at the nominal value. The control signal VCXO Control is used to adjust the output of the VCXO 32 from the nominal value in order to ensure that the frequency of the digital composite video signal CVInd is equal to the frequency of the analog composite video signal CVInR.

In operation, the analog input composite video signal CVInR and the digital composite video signal CVInd are passed through the burst separators 50 and 52, respectively, thereby extracting their respective burst signals. During the burst period, the phase/frequency detector 54 detects any difference between the phase and the frequency of the two burst signals and outputs an appropriate charge pump control signal representative of the difference detected. The charge pump control signal is then used by the charge pump 56 to accumulate a corresponding error voltage on the charge pump capacitor C1. The accumulated error voltage $V_{C1}$ stored across the capacitor C1 is used to control the output of the PWM 62. The output of the PWM 62 is a pulse having a duty cycle corresponding to the accumulated error voltage $V_{C1}$. As illustrated in FIGS. 5 and 6, a higher accumulated error voltage $V_{C1}$ results in a higher duty cycle of the pulse output VPWM from the PWM 62. In the preferred embodiment of the present invention the error voltage built up on the charge pump capacitor C1 ranges from 1 Volt to 4 Volts. The output VPWM of the PWM 62 ranges from a signal with a 0% duty cycle corresponding to the 1 Volt level to a signal with a 100% duty cycle corresponding to the 4 Volt level.

A first pulse of the PWM 62 having a duty cycle equal to W is illustrated in FIG. 5a. A corresponding output count signal Cout equal to a is illustrated in FIG. 5b. A resulting output burst frequency sinusoidal signal having a frequency f corresponding to the pulse width W is illustrated in FIG. 5c. A second pulse of the PWM 62 having a duty cycle equal to 2 W is illustrated in FIG. 6a. A corresponding output count signal Cout equal to 2a is illustrated in FIG. 6b. A resulting output burst frequency sinusoidal signal having a frequency 2f, corresponding to the pulse width 2 W, is illustrated in FIG. 6c. The examples illustrated in FIGS. 5 and 6 are intended to show that as the duty cycle of the output VPWM of the PWM 62 varies, the output of the counter 64 and the resulting representative burst frequency signal VB vary proportionately.

The duty cycle of the pulse output VPWM from the PWM 62 controls the burst frequency of the signal VB through the feedback loop formed by the components of the NCO 58 integrated within the digital encoder integrated circuit 30. Since the pulse output signal VPWM is coupled to the enable input of the counter 64, a higher duty cycle on the pulse output signal VPWM results in a bigger value output by the counter 64 as the signal Cout. The counter 64 is reset by the horizontal reset signal HReset output from the video/graphics overlay integrated circuit 40. The horizontal reset signal HReset is activated when a horizontal sync pulse is detected before each burst period.

During a burst period the counter output Cout is input to the adder 66. The combination of the adder 66 and the latch 68 coupled together in a feedback loop together form an accumulator that generates the address for the sine lookup table 70. Thus, the address sequence of the sine lookup table 70, during a burst period will correspond to 0, Cout, 2Cout, 3Cout, . . . etc. The frequency of the output sinusoid signal VB depends on how fast the lookup table is scanned. Therefore, the frequency of the output sinusoid signal VB is proportional to the counter output Cout. As illustrated in FIGS. 5 and 6 and described above, a large counter output Cout results in a high frequency sine wave and correspondingly a small counter output Cout results in a low frequency sine wave.

The video display system according to the preferred embodiment of the present invention is designed to be included within a settop box coupled between an analog video cable input, a digital and graphics input and a television set. The preferred embodiment of the present invention is implemented within a video/graphics overlay integrated circuit, Part No. CXA2015Q, which will be available from Sony Corporation of America, 3300 Zanker Road, San Jose, Calif. 95134. It should be apparent however to those skilled in the art that the automatic phase correction circuit of the present invention wherein the phase and frequency of a digital composite video signal are adjusted to correspond to the phase and frequency of an analog composite video signal may have many other applications.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A video display system comprising:
    a. a receiving circuit configured for receiving an analog input composite video signal having a first phase and a first frequency, and a digital input composite video signal having a second phase and a second frequency;
    b. a transmitting circuit configured for outputting an output composite video signal representing a predetermined ratio of the analog input composite video signal and the digital input composite video signal; and
    c. an automatic phase and frequency correction circuit coupled to the receiving circuit and to the transmitting circuit for monitoring the first phase, the second phase, the first frequency and the second frequency and ensuring that the second phase and the second frequency are equal to the first phase and the first frequency, wherein the analog input composite video signal is a master signal and is not adjusted and the digital input composite video signal is a slave signal and is adjusted so that the second phase equals the first phase and the second frequency equals the first frequency.

2. The video display system as claimed in claim 1 wherein the automatic phase and frequency correction circuit comprises a numerically controlled oscillator for generating a sinusoidal output signal.

3. The video display system as claimed in claim 2 wherein the first phase and first frequency are monitored during a burst period of the analog input composite video signal.

4. The video display system as claimed in claim 3 wherein the second phase and second frequency are monitored during a burst period of the digital input composite video signal.

5. The video display system as claimed in claim 4 wherein the sinusoidal output signal generated by the numerically controlled oscillator represents a burst signal of the digital input composite video signal.

6. The video display system as claimed in claim 1 wherein the output composite video signal is coupled to a display device.

7. The video display system as claimed in claim 6 wherein the display device is a television.

8. The video display system as claimed in claim 7 wherein the video display system is included within a settop box.

9. The video display system according to claim 1 wherein the output composite video signal includes both chrominance and luminance information.

10. A video display system for receiving video input signals and outputting an output composite video signal comprising:
    a. an analog input video receiving circuit configured for receiving an analog input video signal having a first phase and a first frequency;
    b. a digital input video receiving circuit configured for receiving a digital input video signal having a second phase and a second frequency;
    c. a phase and frequency detecting circuit coupled to receive a first signal representative of the first phase and the first frequency and a second signal representative of the second phase and the second frequency for detecting a difference between the first signal and the second signal and generating a control output signal representative of the difference signal; and
    d. a correction circuit coupled to receive the control output signal for adjusting the second phase and the second frequency in response to a magnitude of the control output signal.

11. The video display system as claimed in claim 10 wherein the correction circuit comprises a numerically controlled oscillator for generating the output signal.

12. The video display system as claimed in claim 11 wherein the output signal is a sinusoidal signal.

13. The video display system as claimed in claim 12 wherein the sinusoidal output signal generated by the numerically controlled oscillator represents a burst signal of the digital input video signal.

14. The video display system as claimed in claim 13 wherein the sinusoidal output signal is combined into the digital input video signal.

15. The video display system as claimed in claim 14 further comprising a video output circuit coupled to receive the analog input video signal and the digital input video signal for combining the analog input video signal and the digital input video signal into an output composite video signal.

16. The video display system as claimed in claim 15 wherein the analog input video signal and digital input video signal are combined in a predetermined ratio into the output composite video signal.

17. The video display system as claimed in claim 16 wherein the output composite video signal is an analog format signal.

18. An automatic phase correction circuit configured for receiving an analog video signal having a first phase and a first frequency, and a digital input composite video signal having a second phase and a second frequency, comprising:
    a. means for generating an output video signal including a predetermined ratio of the analog video signal and the digital input composite video signal;
    b. means for comparing the first phase and the first frequency with the second phase and the second frequency; and
    c. means for adjusting, coupled to the means for generating and to the means for comparing, for adjusting the second phase and the second frequency in order to lock the second phase to the first phase and the second frequency to the first frequency.

19. The automatic phase correction circuit as claimed in claim 18 wherein the means for comparing includes a phase detector circuit for comparing the second phase to the first phase and generating a phase control signal in response to a detected difference between the second phase and the first phase.

20. The automatic phase correction circuit as claimed in claim 19 wherein the means for comparing further includes a numerically controlled oscillator coupled to receive the phase control signal for generating an output signal in response to the phase control signal.

21. The automatic phase correction circuit as claimed in claim 20 wherein the output signal is a sinusoidal signal.

22. The automatic phase correction circuit as claimed in claim 21 wherein the sinusoidal output signal generated by the numerically controlled oscillator represents a burst signal of the digital input video signal.

23. The automatic phase correction circuit as claimed in claim 22 wherein the sinusoidal output signal is combined into the digital input video signal.

24. A method of automatically adjusting a phase and frequency of an encoded digital composite video signal to lock to a phase and frequency of an analog video signal comprising the steps of:

a. receiving an analog video signal having a first phase and a first frequency;

b. receiving an encoded digital composite video signal having a second phase and a second frequency;

c. monitoring the first phase, the first frequency, the second phase and the second frequency;

d. detecting a first difference between the first phase and the second phase and a second difference between the first frequency and the second frequency;

e. adjusting the encoded digital composite video signal in order to eliminate the first and second differences; and f. generating an output composite video signal including a predetermined ratio of the analog video signal and the encoded digital composite video signal.

25. The method as claimed in claim 24 wherein the step of adjusting is comprised of providing a phase control signal representative of the first difference to a numerically controlled oscillator which generates an oscillator output signal in response to the phase control signal.

26. The method as claimed in claim 25 wherein the oscillator output signal is a sinusoidal output signal.

27. The method as claimed in claim 26 wherein the sinusoidal output signal generated by the numerically controlled oscillator represents a burst signal of the digital input video signal.

28. The method as claimed in claim 27 wherein the sinusoidal output signal is combined into the encoded digital composite video signal.

* * * * *